(12) United States Patent
Borcherding et al.

(10) Patent No.: US 9,458,042 B2
(45) Date of Patent: Oct. 4, 2016

(54) METHOD AND APPARATUS FOR CONTROLLING THE BLOWING AIR AND COOLING AIR OF AN I.S. GLASSWARE FORMING MACHINE

(71) Applicant: Heye International GmbH, Obernkirchen (DE)

(72) Inventors: Karl-Friedrich Borcherding, Nordsehl (DE); Benedikt Felgenhauer, Herford (DE); Dennis Isensee, Lindhorst (DE); Eckhard Möller, Obernkirchen (DE)

(73) Assignee: HEYE INTERNATIONAL GMBH, Obernkirchen (DE)

( * ) Notice: Subject to any disclaimer, the term of this patent is extended or adjusted under 35 U.S.C. 154(b) by 81 days.

(21) Appl. No.: 13/940,364

(22) Filed: Jul. 12, 2013

(65) Prior Publication Data
US 2015/0013387 A1 Jan. 15, 2015

(30) Foreign Application Priority Data

Jul. 14, 2012 (DE) .......... 10 2012 013 840

(51) Int. Cl.
| | | |
|---|---|---|
| *C03B 9/36* | (2006.01) | |
| *C03B 9/38* | (2006.01) | |
| *C03B 9/193* | (2006.01) | |
| *C03B 9/40* | (2006.01) | |
| *C03B 9/453* | (2006.01) | |

(52) U.S. Cl.
CPC .......... *C03B 9/3816* (2013.01); *C03B 9/1936* (2013.01); *C03B 9/3618* (2013.01); *C03B 9/3627* (2013.01); *C03B 9/3636* (2013.01); *C03B 9/3645* (2013.01); *C03B 9/3672* (2013.01); *C03B 9/385* (2013.01); *C03B 9/3825* (2013.01); *C03B 9/3866* (2013.01); *C03B 9/3875* (2013.01); *C03B 9/3883* (2013.01); *C03B 9/3891* (2013.01); *C03B 9/403* (2013.01); *C03B 9/4535* (2013.01)

(58) Field of Classification Search
None
See application file for complete search history.

(56) References Cited

U.S. PATENT DOCUMENTS

| 3,888,647 | A | | 6/1975 | Breeden et al. | |
|---|---|---|---|---|---|
| 4,390,842 | A | * | 6/1983 | Wygant et al. | 324/439 |
| 4,762,544 | A | * | 8/1988 | Davey | 65/29.11 |
| 5,139,559 | A | * | 8/1992 | Kozora | 65/158 |
| 5,324,339 | A | * | 6/1994 | Kozora | 65/29.15 |
| 6,401,491 | B1 | | 6/2002 | Wacke | |

FOREIGN PATENT DOCUMENTS

| DE | 60108548 T2 | 1/2005 |
|---|---|---|
| DE | 60110139 T2 | 4/2005 |
| DE | 10 2004 041 282 B4 | 11/2007 |
| EP | 1318111 B1 | 6/2003 |
| EP | 1894894 A1 | 3/2008 |
| GB | 2297548 A1 | 8/1996 |

\* cited by examiner

*Primary Examiner* — Mark Halpern
(74) *Attorney, Agent, or Firm* — Fox Rothschild LLP

(57) ABSTRACT

In order to achieve reproducible operating parameters of the shaping process of an I.S. glassware forming machine, a central control of all blowing and cooling air flows is proposed, in which in accordance with sections a volume flow of the cooling air including the inlet-side and outlet-side temperatures thereof are measured by means of a measuring device (51, 52) and a heat loss which is associated with the section is ascertained. The heat thus removed in sections is compared with standard values, wherein in the event that tolerance zones are exceeded a variation of the volume flow is initiated by the actuation of restrictors (53, 54). All of the sections of the glassware forming machine which are intended for passage of cooling air are monitored in this way, namely on the basis of a determinable heat loss, so that uniform cooling conditions, which are adapted to a mathematical model, and in this respect a reproducible product quality are achieved.

7 Claims, 8 Drawing Sheets

METHOD AND APPARATUS FOR CONTROLLING THE BLOWING AIR AND COOLING AIR OF AN I.S. GLASSWARE FORMING MACHINE

BACKGROUND OF THE INVENTION

The invention relates to a method and apparatus for controlling blowing air and/or cooling air in an I.S. glassware forming machine.

Control of blowing air during the production of hollow glass articles is significant for the rate of shaping and cooling and, associated with this, for the mechanical stability of the articles in the individual stages of the production process. In this case, it is a question of achieving a reproducible article quality in the face of external, but also internal, disruptive influences caused, e.g., by wear.

Patent document GB 2 297 548 A discloses a method and an apparatus for controlling the blowing pressure of a glassware forming machine, in which a line intended for supplying blowing air, a line intended for discharging blowing air and a line intended for measuring pressure issue in the blowing head which closes a blow mold at the top side. The lines used for the supply and discharge of blowing air are fitted with proportional valves which are connected to a computer-aided control device just like a pressure measuring device disposed at one end of the line used for measuring pressure. The intention is to achieve control of the pressure and the duration of the introduction of blowing air into the blow mold with the aim of producing in the blow mold a blowing and cooling effect which is adapted to the properties of the molten glass. In this case, consideration is to be given to the low mechanical stability due to the temperature of the produced hollow glass articles during and immediately after shaping, and to the low thermal conductivity of the glass. The control device forms a part of a control loop which acts upon the shaping process in the blow mold on the basis of the pressure measurement and optimum stored values, which can be changed where required, of other parameters by means of the proportional valves.

EP 1 894 894 A1 discloses a blow mold of an I.S. glassware forming machine, in which the blowing pressure is controlled with the condition that in a first phase only a relatively low pressure, which is sufficient to stabilize the hollow space of the parison, is developed in the latter, and in particular during the time of reheating, in which edge regions are reheated. This low pressure is such that still no shaping takes place. It is only in a second subsequent phase that blowing air, which is under high pressure, i.e., a pressure intended for actual shaping, is introduced into the said hollow space. Therefore, this document deals merely with the avoidance of deformations as a result of cooling air, which has entered into the blow mold, after reheating has been effected.

EP 1 318 111 B1 describes a method for controlling the blowing air pressure, in which stretching of the parison under the influence of reheating to the bottom of the blow mold is measured by a thermocouple and then, after an adjustable delay has lapsed, blowing air is introduced into the parison at a pressure sufficient to deform the parison to form the finished hollow glass article.

In the method disclosed in DE 601 10 139 T2, the pressure of the blowing air, to which a parison mold and a blow mold of an I.S. glassware forming machine are subjected during the shaping process, is determined in accordance with a stored time profile. For this purpose, proportional valves are disposed in the air supply lines to the parison mold and the blow mold and serve to provide a pressure progression which is characterized over time by stages, wherein a distinction is made between a blowing phase and a cooling phase.

Finally, it is known from document DE 601 08 548 T2 to effect control of the blowing air and the cooling air for the neck region of a hollow glass article in the blow mold of a glassware forming machine in each case with the cooperation of a solenoid valve which can be switched on and off and whose switching times are arranged in accordance with the operation cycle specified by a central controller, wherein the switching states of the valves and the input-side pressure of the blowing air and cooling air, as provided by the switching positions of said valves, upstream of the blow head are recorded and compared with the specified machine timing, and wherein in the case of deviations a trouble signal is generated.

The prior art listed above demonstrates that the actual object of the shaping process, the hollow glass articles to be produced, namely the state thereof, is taken into account at the utmost indirectly or only partially. The temperature of the article in its entirety is not measured in the individual stations of the process which, however, is of considerable importance for the deformation behavior and equally the mechanical stability of the article. The blowing air used for shaping both in the parison mold and in the blow mold always exerts not only a shaping effect but also a cooling effect and definitively determines the temperature to which the article is subjected. However, this temperature is subjected to numerous influences which are caused inter alia also by the environment. However, to achieve a reproducible product quality, it is necessary to produce uniform deformation conditions which is achieved only in partial aspects by this prior art.

In order to improve the quality of the hollow glass article and to accelerate the production time, it is known from document DE 10 2004 041 282 B1 to equip a blow head of a glassware forming machine with a blow pipe which can be lowered into the hollow glass article in a motor-driven manner, in this case by means of a piston-cylinder unit.

SUMMARY OF THE INVENTION

The object of the invention is to develop a method of the type set forth in the introduction in such a manner that the conditions of the deformation process, in particular relating to the deformation behavior of the hollow glass article to be produced are more extensively measured and utilized, and in particular with the aim of harmonizing them. In the case of a method such as this, this object is achieved by the features of the invention whereby cooling air flow is controlled on the basis of a volume flow (volume flow rate) of the cooling air which passes through the cooling section of the glassware forming machine. The temperature of the cooling air is measured on the inlet side and outlet side in relation to the section being cooled, wherein the heat loss relating to the section is measured and, in accordance with a comparison of this loss with desired values, the volume flow is varied.

It is important for control of the cooling air flows that the control is effected according to sections of the glassware forming machine which are to be cooled and which are in thermal contact with the cooling air, wherein the heat loss occurring between the inlet and outlet of the section is measured, is compared to a desired value or tolerance zone and used as a basis for varying the volume flow of the cooling air. In sections, a heat loss is thus measured and compared to standard values, on the basis of which the volume flow used for cooling purposes is changed where required, and moreover with the aim of achieving a desired heat loss in the respective section. This principle is applied consistently for all sections to be cooled and provides a way of ensuring that the temperature of the hollow glass articles to be produced, starting with the parison produced in the parison mold through to the finished hollow glass article to be placed on a dead plate, is kept stable against external influences, so that with regard to the temperature uniform reproducible conditions are achieved which affect both the deformation behavior and the mechanical stability of the article which is transferred from the dead plate to a lehr by means of a conveyor belt.

This method can also be used to identify sources of flaws in the form of e.g. defective tubes, valves etc. and differences in the individual stations of an I.S. glassware forming machine, to compensate for temperature differences and to signal the departure from tolerance ranges.

It is important for control of the blowing air flows both in the parison mold and the blow mold that in accordance with the features of another embodiment of the invention, the blowing and/or suction work applied to shaping is ascertained with the aid of a volume flow of the blowing air and of the pressure and is used in accordance with desired values to ascertain the end of the shaping procedure. In order to vary the applied blowing and/or suction work, the pressure, time and/or volume flow can be varied in order to achieve a defined deformation rate in the parison mold or blow mold. It is also important that after this first phase, which is used mainly for shaping purposes, there follows a second phase which is intended for cooling purposes and which in turn is based upon a measurement of the heat loss and adapts same where required according to desired values by varying the volume flow of the air.

At this juncture, it should be already noted that the entire energy balance, of which the blowing or suction work makes up only a portion and plays a role only in the said first phase, is of considerable importance. However, the heat extracted from the hollow glass article in the individual production stations beginning with the parison mold and ending on the dead plate is of more crucial importance.

In accordance with the features of another embodiment of the invention, a mathematical model is proposed which measures all blowing and cooling procedures and describes sections of the process for producing hollow glass articles in terms of controlling and conditioning of blowing and cooling air flows with the aid of desired values relating to heat losses, temperatures, volume flows and pressures and which forms the basis for a central control and serves to provide stable operating parameters beginning with the parison mold and ending on the dead plate. The heat losses measured in sections allow conclusions to be drawn relating to the current temperature of the article to be formed.

It is also the object of the invention to design an apparatus for carrying out the method in accordance with the features of the above described embodiments, which allows the state of the hollow glass article to be formed to be considered in a way which is differentiated with respect to the prior art. In the case of an apparatus such as this, this object is achieved by the features of an apparatus as described below.

Accordingly, it is essential to the invention that the cooling air passage is divided into individual sections which are each equipped with measuring devices for measuring a volume flow and for measuring inlet-side and outlet-side temperatures, a control device and means for varying the volume flow as an actuating variable. The temperature profile of the articles to be formed can be reproduced in this way along the sections.

In accordance with the features of another embodiment of an apparatus, each blowing and cooling air passage comprises a measuring device for measuring a volume flow, measuring devices for measuring inlet-side and outlet-side temperatures, a measuring device for measuring the pressure, a control device and means for varying the volume flow and the pressure of the blowing and cooling air. In this manner, all of the parameters which describe the deformation procedure are measured and can be utilized in a control.

In accordance with the features of another embodiment, all of the sections of a blowing and/or cooling air passage, in particular the control devices thereof, are connected to a superordinate machine controller which serves to coordinate the controls allocated in each case to the individual sections.

In accordance with the features of yet another embodiment of an apparatus, each blow head has a valve provided therein which is closed during the said first phase, permitting a build-up of pressure within the article to be formed, and which is opened during the said second phase, in order to develop a cooling effect. The valve is actuated by means of the control device allocated to the section, as soon as an end of the shaping procedure is signaled.

The features of still further embodiments of the apparatus are directed to a pipe section intended to introduce cooling air, a blow pipe which protrudes into the hollow glass article and can be fixed in an axially displaceable manner to the blow head. In the cooling phase, this permits effective internal cooling of the hollow glass article, in particular the lower regions thereof adjacent to a floor.

The features of additional embodiments of the apparatus are directed to means which function as actuating variables for varying a volume flow and the pressure of the blowing and cooling air flow.

It is apparent from the statements above that by means of the inventive method or the apparatus presented, manual interventions in the operation of a glassware forming machine can be minimized.

BRIEF DESCRIPTION OF THE DRAWINGS

An apparatus intended to carry out the method in accordance with the invention is explained in greater detail hereinafter with reference to the accompanying drawings which illustrate in each case sections of the blowing and cooling air passage. In the drawings.

DETAILED DESCRIPTION OF THE INVENTION

Figure 1:
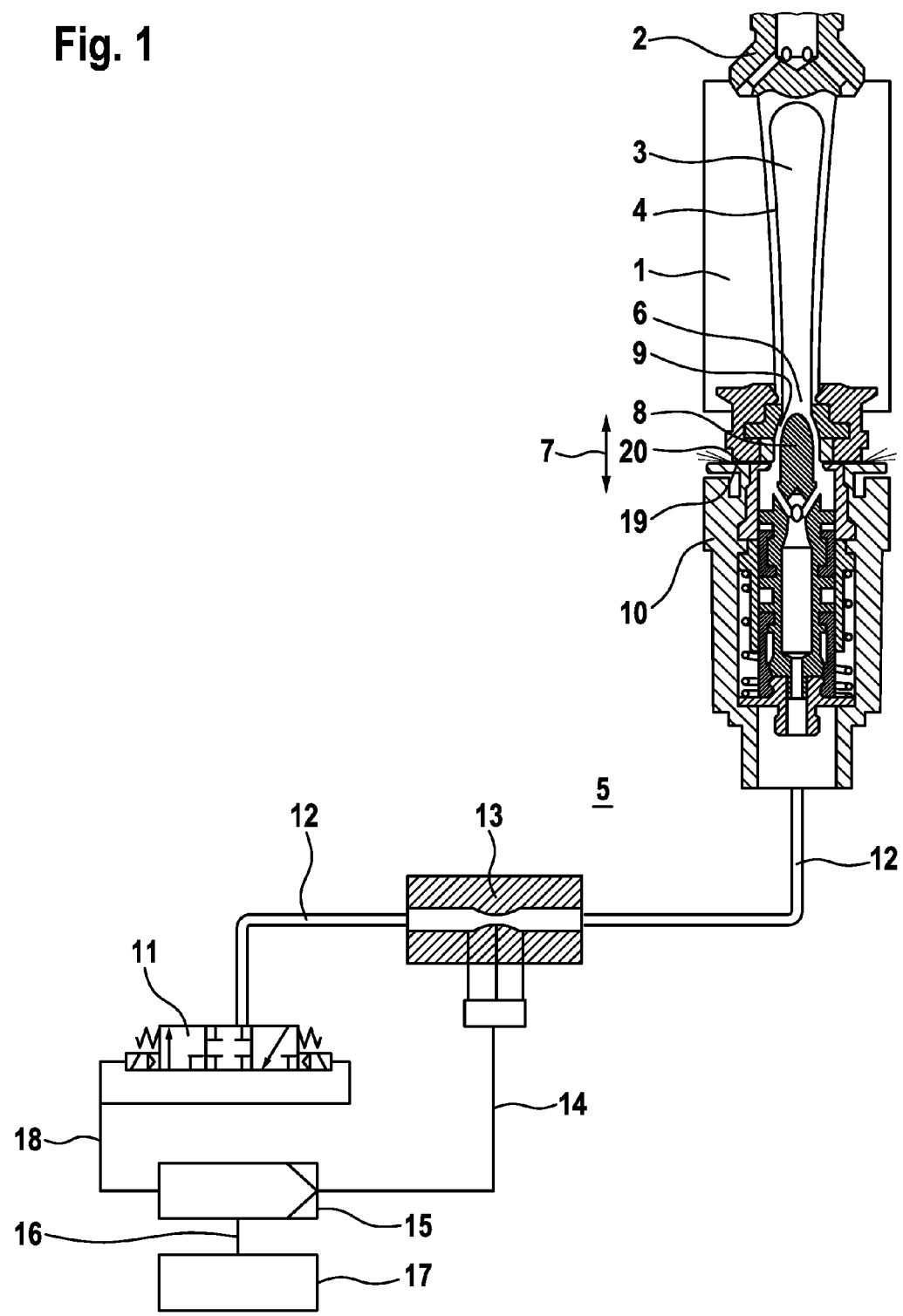
FIG. 1 shows a schematic diagram of the cooling air passage for pre-blowing in the parison mold.

In FIG. 1, the parison mold of an I.S. glassware forming machine which is formed so as to be divided along an axial plane and consists of two mold halves is designated by the reference numeral 1 and is located in the closed position and is closed at the top side by means of a pre-floor 2. Located inside the mold space 3 after the shaping process is completed is the parison 4 whose neck opening 6 facing towards the underside 5 is confronted by a plunger 8 which is displaceable in the longitudinal direction 7.

FIG. 1 shows the plunger 8 in a position which uncovers an annular flow cross-section 9 in the region of the neck opening 6, via which cross-section blowing air can be introduced, starting from a plunger cylinder upper part 10, into the mold space 3 of the parison 4.

FIG. 1 shows the procedure of pre-blowing which is used only when the process is conducted in the manner of a blow-and-blow process which is known per se.

Blowing air is supplied to the plunger cylinder upper part 10 starting from a proportional valve 11 via a line 12, in the course of which there is disposed a measuring device 13 which serves to measure the measurement value describing the volume flow (flow rate) and one describing the temperature thereof. The proportional valve 11 is connected to a compressed air source in a manner not illustrated in the drawings. In terms of its functional principle, the measuring device 13 can be of almost any type, as long as it is suitable for generating an electrical measurement value which describes the volume flow and the temperature thereof.

The measuring device 13 is connected via a line 14—it can also be a group of lines—to a control device 15 which for its part is connected via a line 16 to a superordinate machine controller 17 and via further lines 18 to the proportional valve 11.

The reference numeral 19 designates a valve which is located in the neck region of the parison mold 1 and whose function will be explained in greater detail hereinafter. The reference numeral 20 designates a measuring sensor, by means of which the temperature of the blowing air discharged via the valve in its open position can be measured at this location.

The valve 19 which is formed e.g. as a solenoid valve and is controlled in a synchronized fashion by means of the machine controller 17 is closed during a first phase, which serves to shape the parison 4, and is only opened after shaping is terminated. The second phase which follows is a cooling phase, during which cooling air flows via the line 12, the flow cross-section 9, the mold space 3 and the valve 19. The end of the blowing procedure is identified in a manner still to be described hereinafter, wherein with the aid of the inlet-side and outlet-side measurement of the temperature of the cooling air the extraction of heat of the parison 4 is ascertained and is utilized in a manner to be described hereinafter for control purposes.

The air passage shown in FIG. 1 is the air required for shaping in the manner of a blow-and-blow process in the parison mold 1 as part of a pre-blowing procedure.

Figure 2:
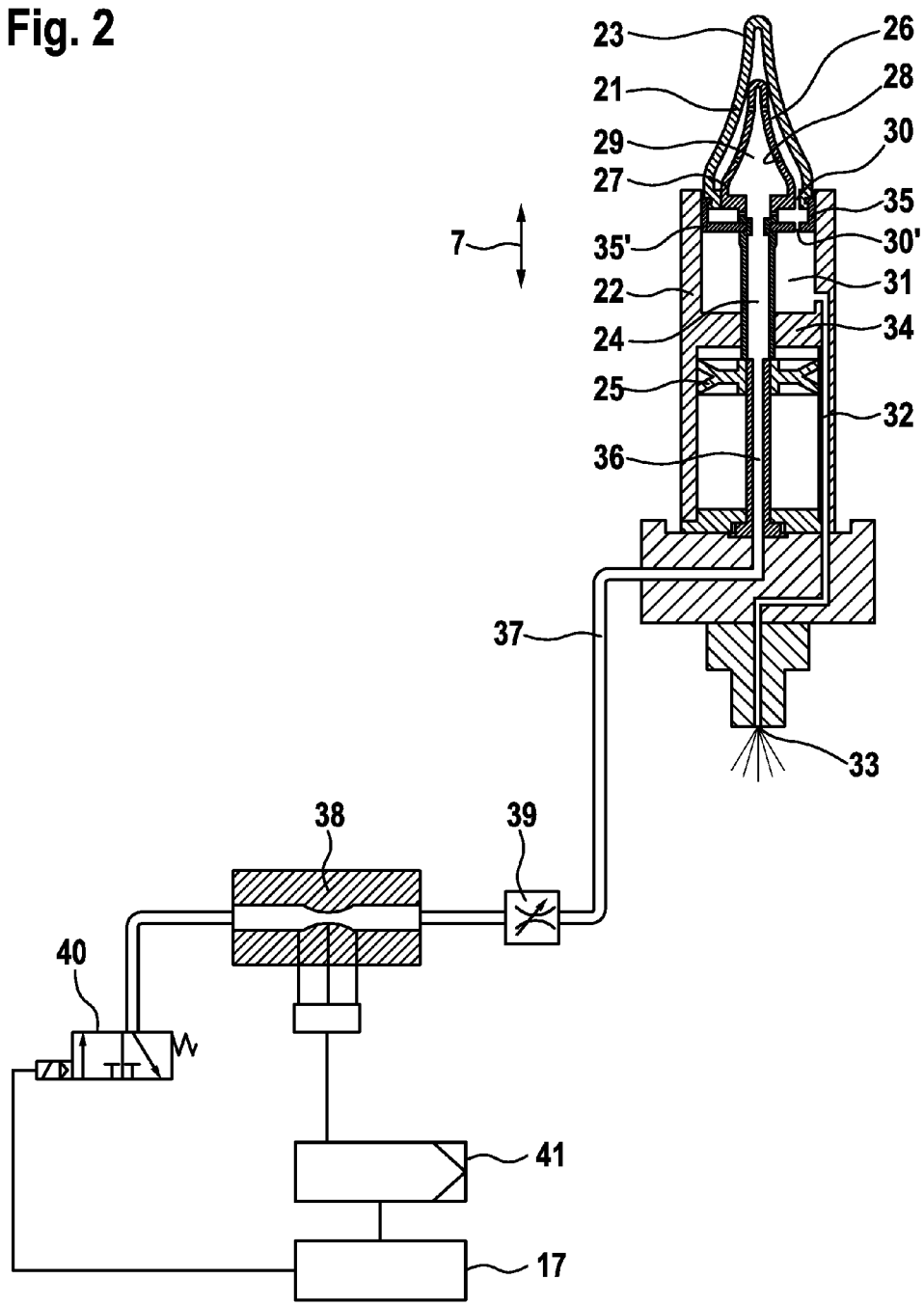
FIG. 2 shows a schematic diagram of the cooling air passage for plunger cooling in the parison mold.

FIG. 2 shows an air passage intended for plunger cooling on the parison mold side, in which the neck mold has been omitted from the illustration in the drawings.

In the case of this method which is used in the press-and-blow process for shaping the parison, the parison is removed from the mold by means of a plunger 21 which is introduced via a neck mold.

The plunger 21 is guided in a longitudinally displaceable manner in a cylinder 22 and consists of a hollow mold part 23 which forms a mold profile and is fixedly connected to a piston 25 by means of a pipe element 24 which extends in an axial manner inside the cylinder 22. Extending inside the mold part 23, and in particular with an intermediate space 26 being left, is a hollow hub 27, whose walls are provided with cut-outs 28 and whose inner space 29 is continuously connected directly to the pipe element 24. For its part, the intermediate space 29 is connected to an outlet opening 33 via an opening 30, an annular space 31 surrounding the pipe element 24 and a line 32 extending partially inside the wall of the cylinder 22.

The annular space 31 extends inside the cylinder 22 and is axially delimited by means of a fixedly disposed intermediate wall 34 of the cylinder 22 and two half shells 35, 35, also referred to as "split rings", which are intended to connect the plunger 21 to the pipe element 24 in a positive-locking manner and which enclose a hollow space which is continuously connected to the intermediate space 26 via the said opening 30' and is continuously connected to the annular space 31 via at least one opening 30'.

The reference numeral 36 designates a further pipe element which is fixedly disposed inside the cylinder 22, extends on the peripheral side in a sealing manner into the pipe element 24 and is connected to a valve 40 via a line 37, in the course of which there are disposed a measuring device 38 and an electrically pilot-controlled restrictor 39, said valve being connected to a pressure source, not illustrated in the drawings.

A control device 41 is connected to the machine controller 17 as well as to the measuring device 38, which is arranged for measuring a volume flow and the temperature thereof, and to the restrictor 39.

Located in the outlet opening 33 is a measuring sensor which is intended to measure the temperature of the air flow exiting at this location.

The cooling air passage as shown in FIG. 2 serves to cool the plunger 21 of the parison mold 1 shown in FIG. 1, wherein with the aid of the measurement values of the temperatures of the cooling air which are obtained on the inlet side and outlet side a heat extraction is measured and utilized in a control which is still to be described hereinafter.

Figure 3:
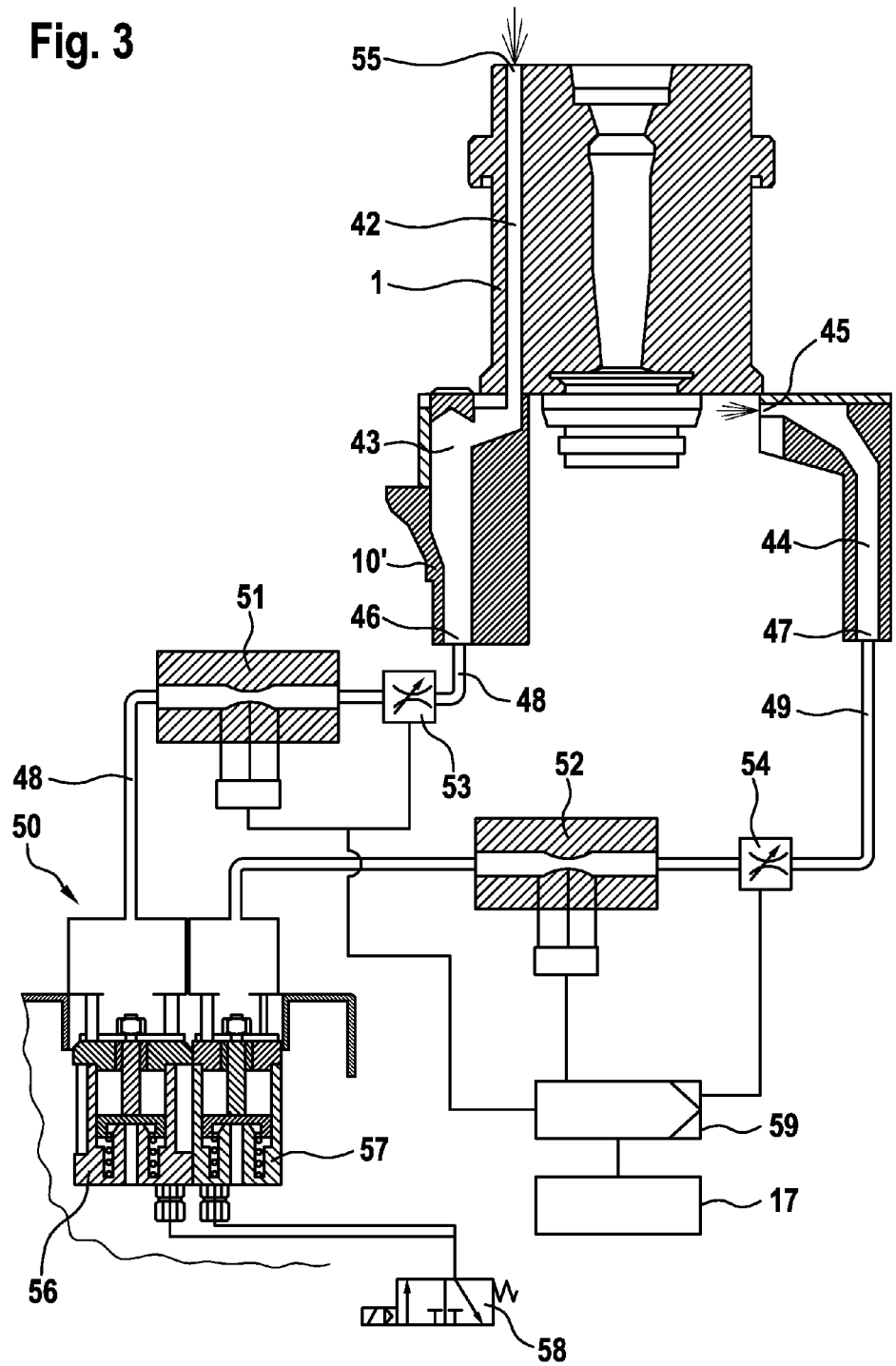
FIG. 3 shows a schematic diagram of the cooling air passage for mold cooling in the parison mold.

FIG. 3 shows a further air passage which is allocated to the mold cooling and the neck cooling of the parison mold 1.

For this purpose, passing through the mold wall of the parison mold 1 is at least one line, preferably a group of lines 42 which extend in an axially parallel manner with respect to the approximately rotationally symmetrical parison mold 1 and are continued in lines 43 of the cooling base 10'. The cooling base 10' serves as a connection part and transfer point for the neck cooling air and mold cooling air.

Disposed inside the cooling base 10' is a further line 44—it can also be group of lines 44—which has/have an outlet opening 45 in immediate proximity to the neck region of the parison mold, so that the cooling air exiting via this opening exerts a cooling effect upon the neck region.

The end 46 of the line 43 remote from the parison mold and the end 47 of the line 44 remote from the parison mold 1 are connected to a valve assembly 50 via respective lines 48, 49, wherein a measuring device 51, 52 and a pilot-controlled restrictor 53, 54 are each disposed in the course of these lines 48, 49.

Both measuring devices 51, 52 are arranged for measuring measurement values relating to the volume flow and the temperature thereof, wherein these measurement values are provided as electrically convertible measurement values. These temperatures thus represent the inlet temperatures of the respective cooling air flows. Located in the outlet opening 45 of the line 44 and likewise in the outlet opening 55 of the line 42 are respective measuring sensors, by means of which the temperatures of the cooling air exiting at these locations can be measured.

The valve assembly 50 consists of two valves 56, 57 which are disposed in each case upstream of the lines 48, 49 and are connected to a compressed air source, not illustrated in the drawings. They are pneumatically pilot-controlled valves, wherein the reference numeral 58 designates the pilot valve allocated thereto.

The measuring devices 51, 52 are connected to a control device 59. The same applies to the restrictors 53, 54 which are formed as electrically pilot-controlled restrictors. For its part, the control device 59 is connected to the superordinate machine controller 17.

The cooling air passage as shown in FIG. 3 serves to cool the parison mold 1 and the neck region thereof, wherein with the aid of the measurement values of the temperatures of the cooling air which are obtained on the inlet side and outlet side a heat extraction is measured and utilized in a control which is still to be described hereinafter.

Figure 4:
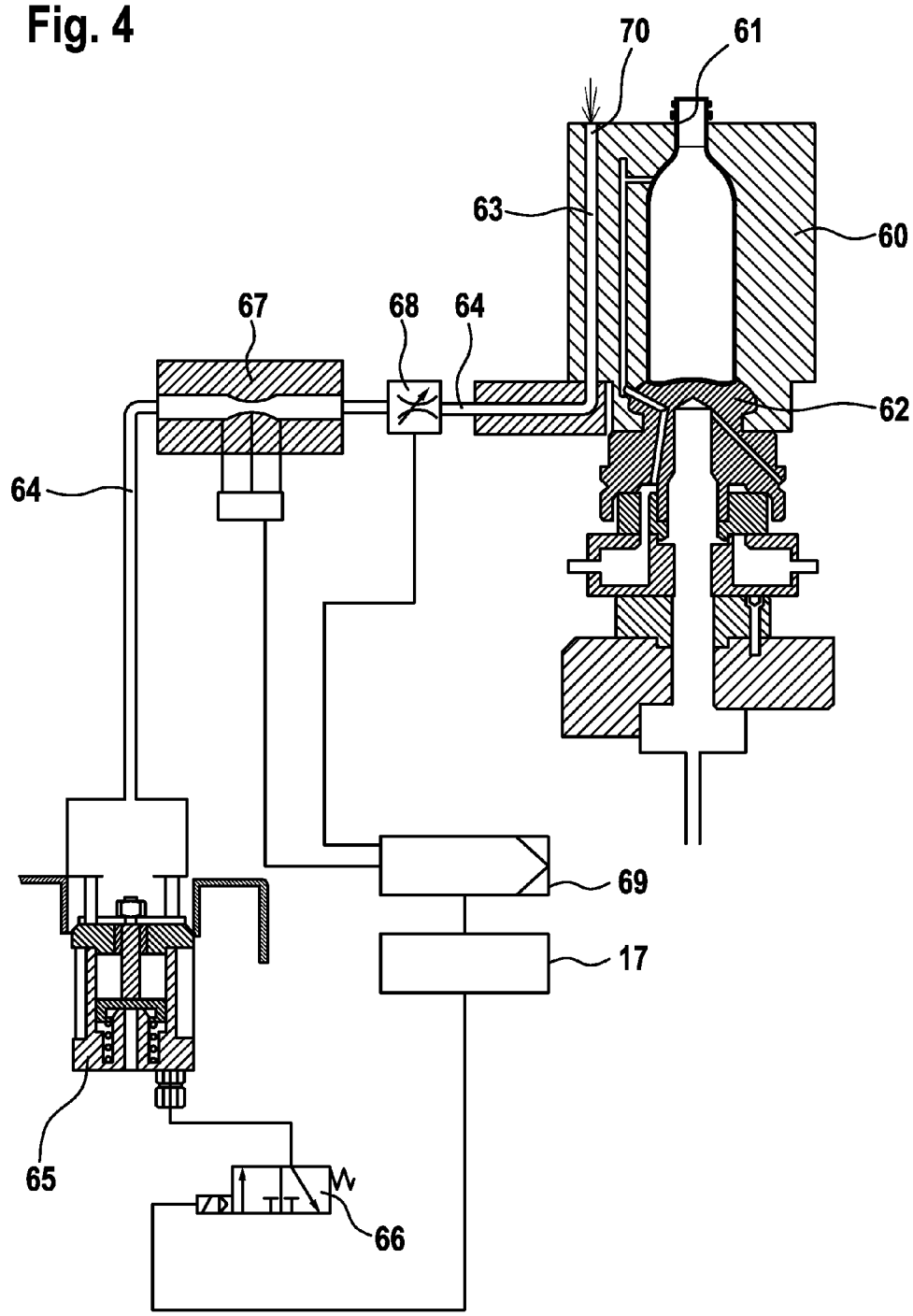
FIG. 4 shows a schematic diagram of the cooling air passage for mold cooling in the blow mold.

In FIG. 4, the reference numeral 60 designates a blow mold, in which a finally formed hollow glass article 61 is located. The blow mold 60 is divided along a vertical mold parting line, which includes the axis thereof, into two mold halves which are closed on the underside by a base 62. Extending inside the mold halves is a line 63 which is continued outside the blow mold in a line 64 and is connected to a valve 65. This valve is connected to a compressed air source, not illustrated in the drawings, and can be actuated by means of a pilot valve 66.

Located in the course of the line 64 is a measuring device 67 for measuring the volume flow of the air therethrough and the temperature thereof, and an electrically pilot-controlled restrictor 68. The measuring device 67 and the restrictor 68 are connected to a control device 69 which for its part is connected in turn to the machine controller 17. Actuation of the pilot valve 66 is effected via the machine controller 17.

Disposed in an outlet opening 70 of the line 63 inside the blow mold wall is a measuring sensor, by means of which the temperature of the air exiting at this location is measured.

The cooling air passage as shown in FIG. 4 serves to cool the blow mold 60, wherein with the aid of the measurement values of the temperatures of the cooling air which are obtained on the inlet side and outlet side a heat extraction is measured and utilized in a control which is still to be described hereinafter.

Figure 5:
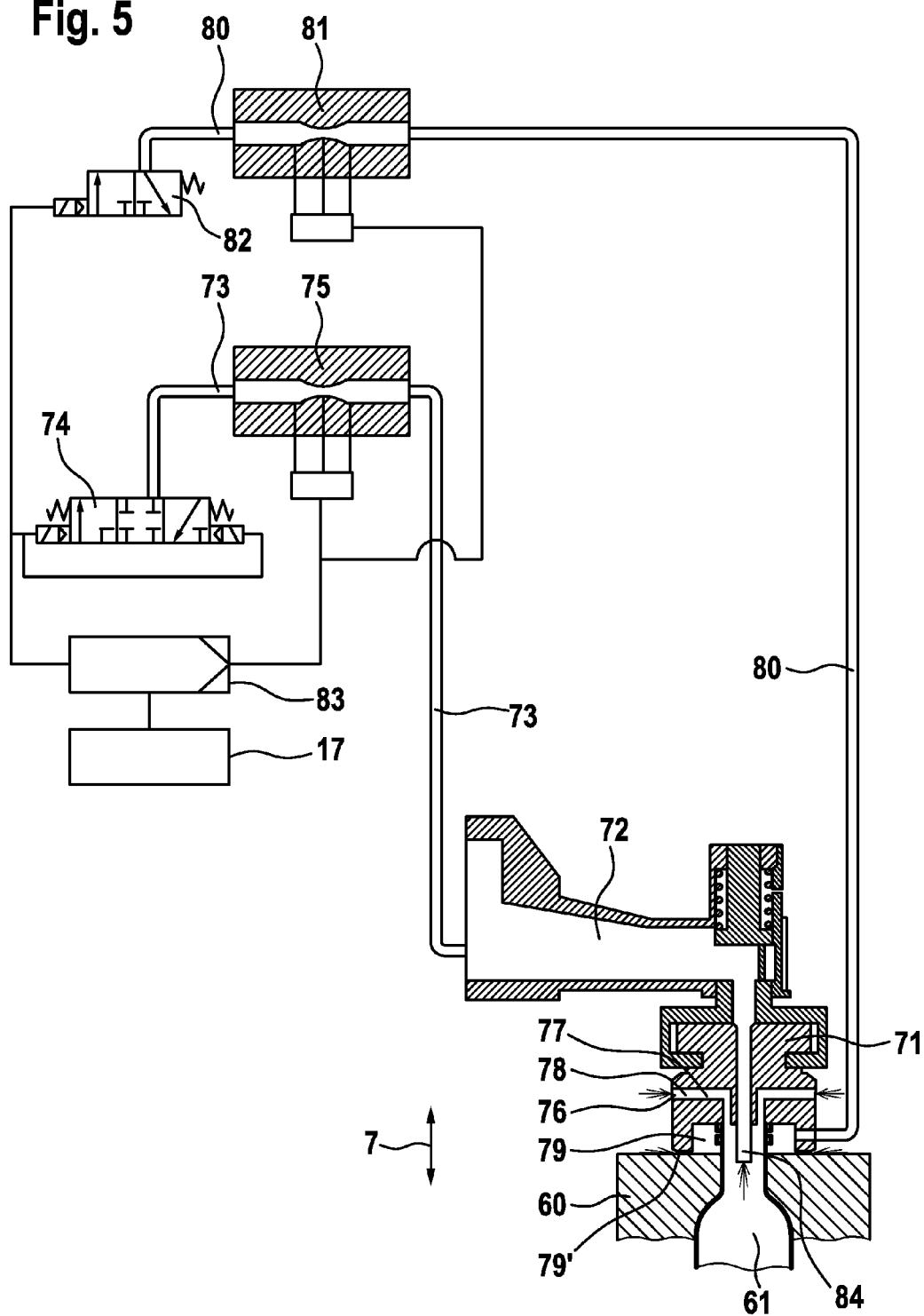
FIG. 5 shows a schematic diagram of the cooling air passage for neck cooling of the blow mold.

FIG. 5 shows the blow head 71 of the blow mold 60 which is connected via a blow head holder 72 to a line 73 which is connected to a proportional valve 74. The proportional valve 74 is connected to a compressed air source, not illustrated in the drawings. Located in the course of the line 73 is a measuring device 75 which is arranged for measuring the volume flow and the temperature of the air flowing in the line 73. The blow head 71 is provided with an outlet opening 76 which is provided with a measuring sensor 77 for measuring the temperature of the air flowing out at this location. The reference numeral 78 indicates a valve which is intended and arranged for opening or uncovering the outlet opening 76.

The blow head 71 is provided with an annular space 79 which directly surrounds the mouth of the hollow glass article and to which a line 80 is connected, in the course of which there is located a measuring device 81 which is arranged for measuring the volume flow and the temperature of the air flowing in the line 80 and which is connected to a valve 82 which is connected to a compressed air source in a manner not illustrated in the drawings.

Both measuring devices 75, 81, the proportional valve 74 and the valve 82 are connected to a control device 83 which for its part is connected to the machine controller 17.

The reference numeral 79' designates an outlet opening which is allocated to the annular space 79 and in which there is disposed a measuring sensor for measuring the temperature of the air flowing out at this location. The air is the neck cooling air.

The valve 78 is closed during a first phase used for shaping the hollow glass article 61 in the blow mold 60 starting from the parison 4, and is only opened after shaping is terminated. The second phase which follows is a cooling phase, during which cooling air flows via the line 73, the blow head holder 72, a pipe section 84 or a blow pipe and the valve 78. The end of the blowing procedure is identified in a manner still to be described hereinafter, wherein with the aid of the inlet-side and outlet-side measurement of the temperature of the cooling air the heat extraction of the hollow glass article 61 is ascertained and utilized for control purposes in a manner which is still to be described hereinafter.

In a particularly advantageous manner, the pipe section 84 or the blow pipe can be disposed so as to be extendible vertically into the hollow glass article, so that its neck opening is located in the lower region of the hollow glass article and a particularly intensive cooling effect is developed in the lower region thereof.

Figure 6:
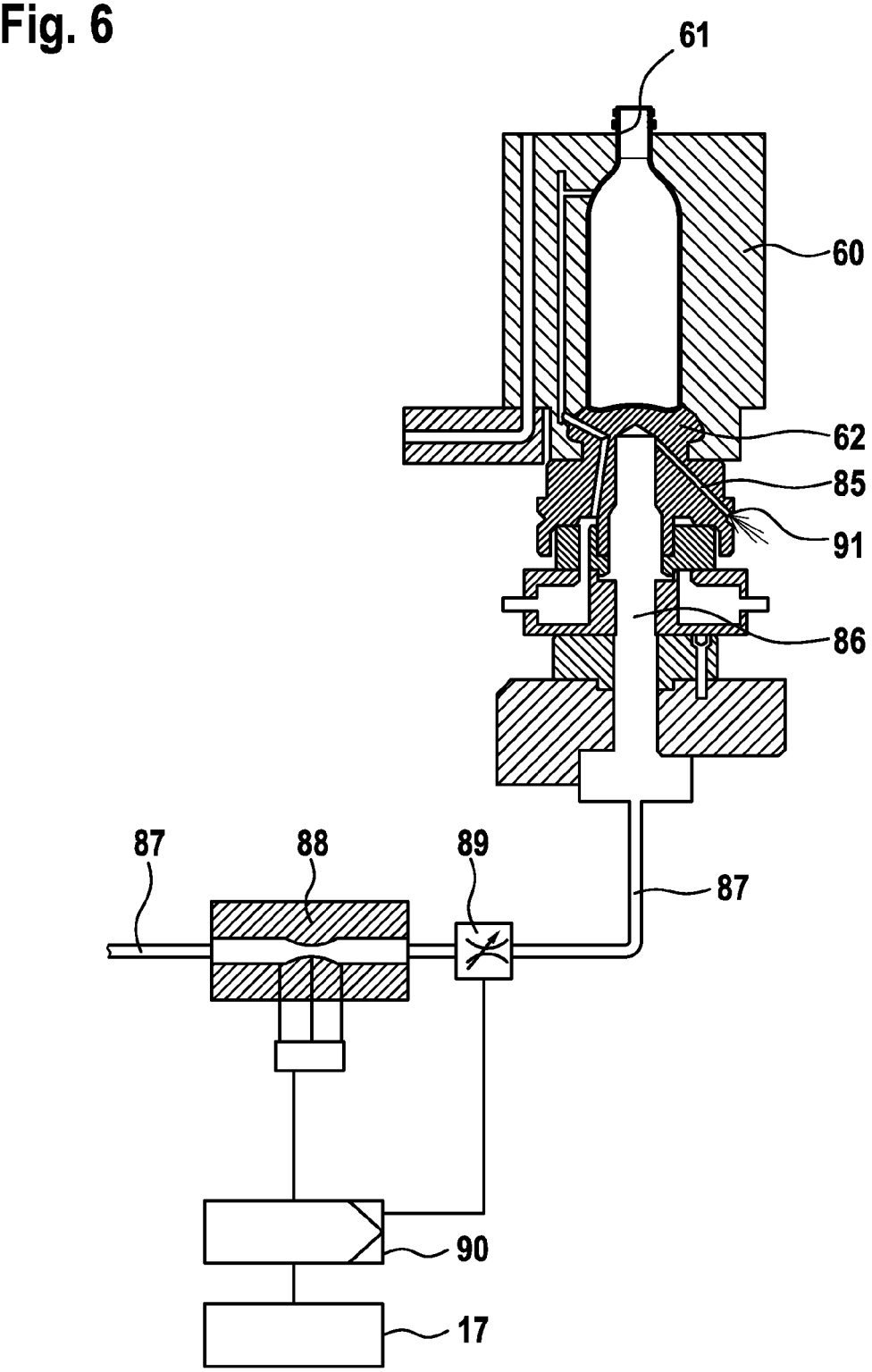
FIG. 6 shows a schematic diagram of the cooling air passage for base cooling of the blow mold.

FIG. 6 shows an air passage which is intended for cooling the base 62 of the blow mold 60. For this purpose, the base 62 is provided with a line 85 which passes through it and is connected via an axially parallel bore 86 to an external line 87, in the course of which there is disposed a measuring device 88 arranged for measuring the volume flow and the temperature of the air flowing in the line 87. The end of the line 87 remote from the bore 86 is in turn connected to a compressed air source with a valve, not illustrated in the drawings, positioned therebetween. Instead of the one line 87, it is also possible to provide a network of lines which pass uniformly through the base 62.

The reference numeral 89 designates a restrictor which is likewise disposed in the course of the line 87 and is electrically pilot-controlled by means of a control device 90. Furthermore, the control device 90 is connected to the measuring device 88 and the machine controller 17.

The reference numeral 91 designates an outlet opening in the base 62 which is fitted with a measuring sensor for measuring the temperature of the air flowing out at this location.

The cooling air passage as shown in FIG. 6 serves to cool the base of the blow mold 60, wherein with the aid of the measurement values of the temperatures of the cooling air which are obtained on the inlet side and outlet side a heat extraction is measured and utilized in a control which is still to be described hereinafter.

Figure 7:
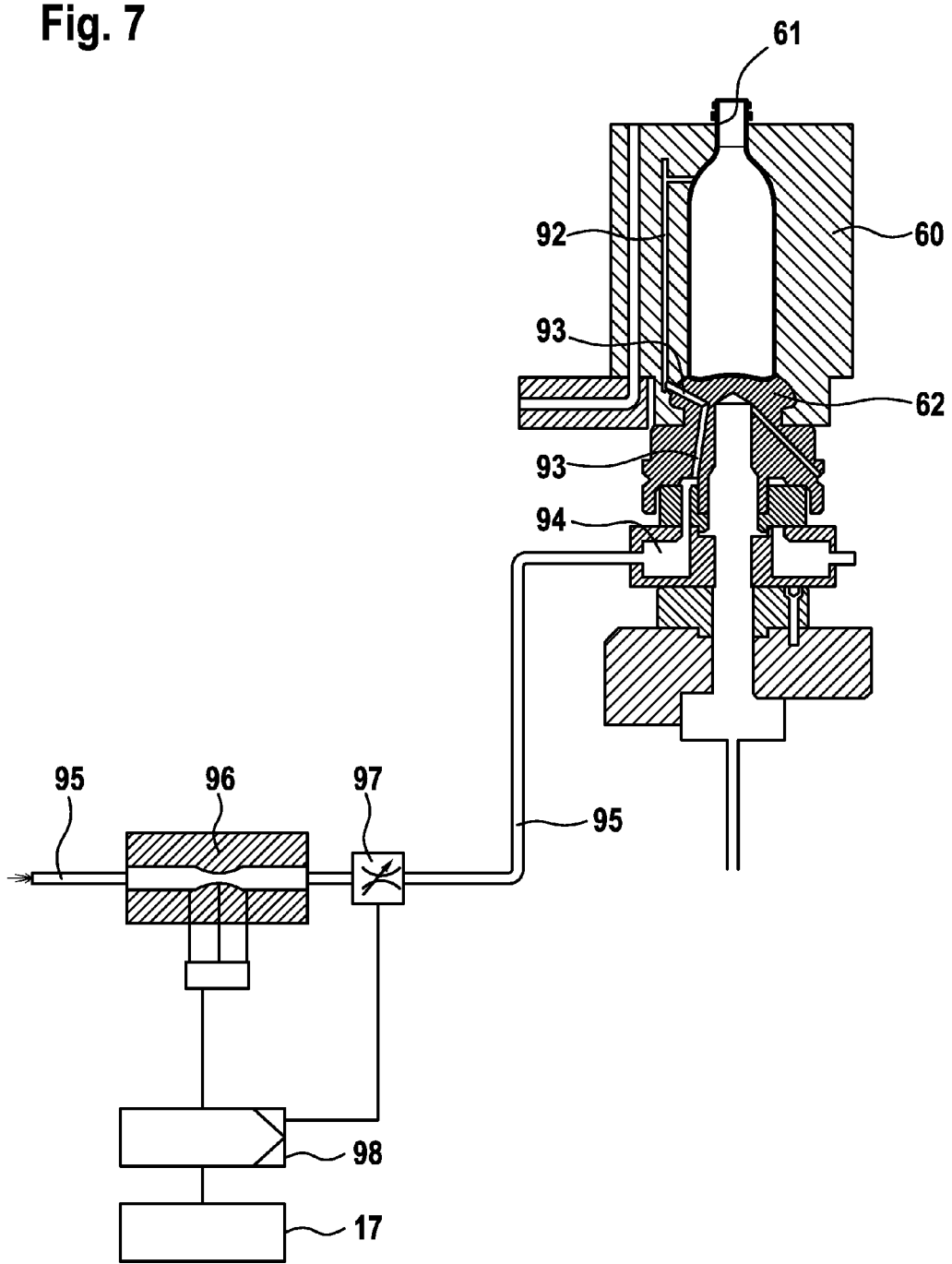
FIG. 7 shows a schematic diagram of the cooling air passage for applying a vacuum to the blow mold.

FIG. 7 illustrates an additional type of cooling air passage which affects the blow mold 60. For this purpose, a line 92—it can also be a network of lines—is provided inside the mold walls and is connected to the ambient atmosphere in a manner not illustrated in the drawings. This line 92 is guided via intermediate sections 93 through the base 62 and issues into a ring-like vacuum chamber 94 which extends coaxially with respect to the axis of the hollow glass article 61 and is connected to a vacuum source, not illustrated in the drawings, via a line 95, in the course of which there are disposed a measuring device 96 and an electrically pilot-controlled restrictor 97. The measuring device 96 is arranged for measuring a volume flow—passing through the line 95—and the temperature thereof and is connected like the restrictor 97 to a control device 98 which for its part is connected to the machine controller 17.

Not illustrated in the drawings is a measuring sensor which is arranged for measuring the temperature of the ambient air entering into the line 92 under the influence of the vacuum. The temperature of the exiting air in the line 95 is measured by the measuring device 95.

The cooling air passage as shown in FIG. 7 serves to cool the mold walls of the blow mold 60, wherein with the aid of the measurement values of the temperatures of the cooling air which are obtained on the inlet side and outlet side a heat extraction is measured and utilized in a control which is still to be described hereinafter.

This type of air passage shown in FIG. 7 can also be provided in addition to the air passage presented in FIG. 4. This air passage can be used for shaping and also for cooling, i.e., can run in parallel with blow mold blowing air, blow mold neck cooling air, with blow mold base cooling etc. and can always be active.

Figure 8:
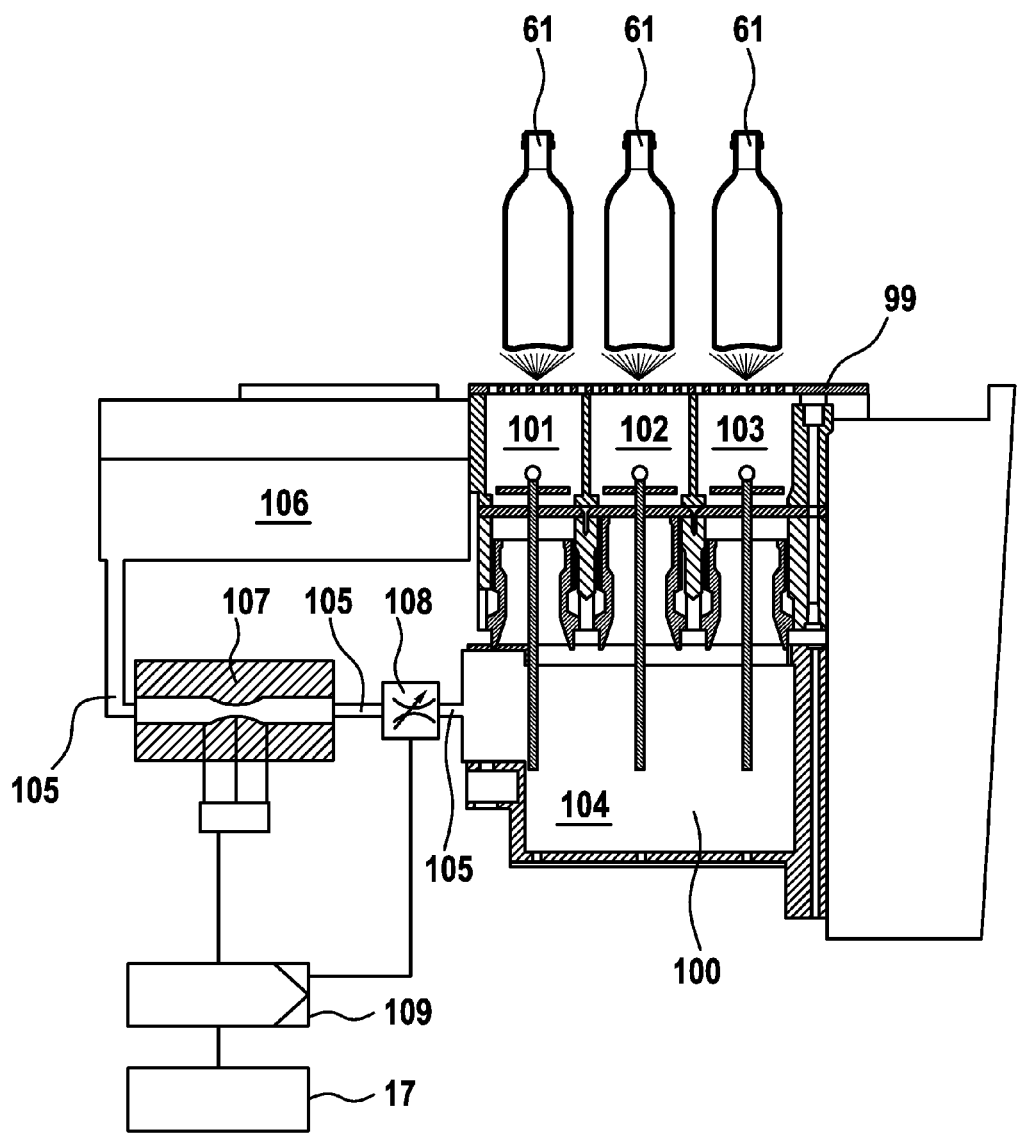
FIG. 8 shows a schematic diagram of the cooling air passage for dead plate cooling.

FIG. 8 shows an air passage intended for cooling a dead plate 99. In this case, the reference numeral 100 designates a substructure of the dead plate 99 which serves to distribute a cooling air flow to three chambers 101, 102, 103 arranged immediately below the dead plate 99, and in particular starting from an inlet chamber 104. However, instead of three chambers it is also possible to provide more or less than three such chambers depending on the gobs to be processed in the station. Disposed between the inlet chamber 104 and the individual chambers 101, 102, 103 are valves which render it possible to subject the chambers to cooling air to different extents, so that zones having a correspondingly different cooling effect can be arranged on the dead plate 99.

A cooling effect is to be exerted in each case upon hollow glass articles 61 which in accordance with a specifiable time period are initially held above the dead plate 99 and then placed thereon.

The inlet chamber 104 is connected via a line 105 to a chamber 106 which is connected in a manner not illustrated in the drawings to a compressed air source, e.g. a fan. In the course of the line 105 there are located a measuring device 107, which is intended to measure the volume flow—flowing through the line—and the temperature thereof, and an electrically pilot-controlled restrictor 108 which are connected to a control device 109 which for its part is connected to the machine controller 17.

Not illustrated in the drawings is at least one measuring device which is arranged for measuring the temperature of the warmed air flowing off from the hollow glass articles 61.

The cooling air passage as shown in FIG. 8 serves also to cool the bases of the hollow glass articles located above the dead plate 99, and the substructure 100, wherein with the aid of the measurement values of the temperatures of the cooling air flowing off from the hollow glass articles, which measurement values are obtained on the inlet side by means of the measuring device 107 and are obtained on the outlet side by means of the measuring device, not illustrated in the drawings, a heat extraction is measured and utilized in a control which is still to be described hereinafter.

The above-described air passages which are used in the case of an I.S. glassware forming machine include those relating to a blow passage, whose purpose resides in shaping and cooling, those e.g. for the parison mold 1 (FIG. 1) and for the blow mold (FIG. 4) and those which are intended merely for cooling purposes, those e.g. relating to mold, neck and plunger cooling of the parison mold (FIGS. 2 and 3), mold cooling of the blow mold (FIGS. 4 and 7), base cooling of the blow mold (FIG. 6) and dead plate cooling (FIG. 8).

Each of the air passages intended for shaping and cooling purposes is allocated a control loop whose input variables are produced by means of the volume flow of the blowing air measured by means of the measuring device 13, 38, 51, including the inlet temperatures measured thereby and the outlet temperatures of the blowing air measured at the outlet openings 33, 45, 55. Each of these control loops is allocated an actuating element in the form of a proportional valve 11 or a pilot-controlled restrictor 39, 53, 54, by means of which the volume flow of the blowing and cooling air is continuously variable.

Each of the air passages intended for cooling purposes is likewise allocated a control loop whose input variables are produced by the volume flow of the cooling air measured in each case by means of the measuring device 67, 75, 88, 96, 107, including the inlet temperatures measured thereby and the outlet temperatures of the cooling air measured at the outlet openings 70, 76, 79', 91. Each of these control loops is allocated an actuating element in the form of a pilot-controlled restrictor 68, 86, 97, 108 or a valve 82 or a proportional valve 74.

The measuring of the respective inlet-side and outlet-side temperatures of these air passages in conjunction with the volume flows guided therein is used to produce a heat flow which is related to the respective air passage or the section allocated thereto, so that the heat loss which the glass to be formed experiences beginning with the forming of the parison 4 and ending on the dead plate 99 is illustrated in a differentiated manner, in particular in sections. This is used in turn to establish the temperature of the product and then to test whether it corresponds to the desired boundary conditions of the respective section e.g. of the parison mold 1, the blow mold 60 or even the dead plate 99 or whether interventions such as the changing of volume flows are required.

In this way, it is possible to develop a mathematical model of glass shaping in the form of desired values, relating to the heat extraction and the temperatures to be tolerated in the individual method sections or interfaces thereof, which model can be used as a basis for a control—adapted to the individual sections—ultimately of the temperature of the articles to be formed, the deformation behavior thereof and finally the mechanical stability thereof. This contributes to the achievement of a reproducible product quality.

The machine controller 17 serves to coordinate these individual control loops, so that in this respect a uniform control is provided for all blowing and cooling air passages. The mere distribution of the individual functions of this type of control to the said control devices 15, 41, 59, 69, 83, 90, 98, 109 and the machine controller 17 is to be understood merely as an example and can also be presented differently from the description above.

As far as the cooling function is concerned, the restrictors 39, 53, 68, 86, 97, 108 function as actuating variables, optionally in conjunction with the valves 40, 56, 57, 65, 82 arranged merely to effect the opening and closing of the respective line. They permit a variation in the volume flow of the cooling air in the respective sections.

As far as the cooling function following on from shaping is concerned, the proportional valves 11, 74 function as actuating variables and are also arranged to effect opening and closing of the respective line.

The plunger cylinder upper part 10 and the cooling base 10' of the parison mold 1 and the blow head 71 of the blow mold 60 are fitted with pressure sensors, not illustrated in the drawings, by means of which the pressure progression during shaping is measured and represented by an electrical signal which is transmitted via the respective control device 15, 41, 83 to the machine controller 17. From the measurement values of a volume flow, of the pressure values measured by means of the respective measuring device 13, 38, 75 and by means of these pressure sensors it is possible during the course of the integration to ascertain the blowing work and represent it by virtue of a value which renders it possible to identify the end of the blowing or shaping procedure. If this end is reached, a cooling phase follows in which only a cooling function is exerted with the incoming air, and furthermore in accordance with the product temperature desired at the end of the respective section. This means that with the aid of a desired value, which describes the blowing work, the pressurization of the parison mold and of the blow mold is effected over time in accordance with a standardized pattern which is oriented towards a uniform reproducible work result. The actuating variable which can be used in terms of the blowing work can be the pressure which is variable by means of a pressure control valve, not illustrated in the drawings. Furthermore, the pressure is significant particularly during final blowing, since the vertical glass distribution is influenced thereby as is the rate and uniformity, with which cooling occurs. By controlling the pressure of the blowing air in conjunction with the volume flow thereof, it is possible to influence the progress of the blowing procedure over time, in particular a deformation rate.

It is apparent from the statements above that the method in accordance with the invention provides a system which controls the blowing and cooling air of all of the sections of an I.S. glassware forming machine in terms of its cooling and shaping function and which renders it possible to achieve reproducible product qualities. This is achieved on the basis of a comparison of the actual heat extraction in the individual stations including the actual blowing work in the parison mold and the blow mold with corresponding standard values which is used for the purpose of adapting machine settings. In contrast to different cooling effects, e.g. during day or night operation, it is possible in this way to make a contribution towards achieving reproducible product qualities.

LIST OF REFERENCE NUMERALS 1 parison mold
2 pre-floor
3 mold space
4 parison
5 underside
6 neck opening
7 longitudinal direction
8 plunger
9 flow cross-section
10 plunger cylinder upper part
10' cooling base
11 proportional valve
12 line
13 measuring device
14 line
15 control device
16 line
17 machine controller
18 lines
19 valve
20 measuring sensor
21 plunger
22 cylinder
23 mold part
24 pipe element
25 piston
26 intermediate space
27 hub
28 cut-out
29 inner space
30 opening
30' opening
31 annular space
32 line
33 outlet opening
34 intermediate wall
35 half shell
35' half shell
36 pipe element
37 line
38 measuring device
39 restrictor
40 valve
41 control device
42 line
43 line
44 line
45 outlet opening
46 end
47 end
48 line
49 line
50 valve assembly
51 measuring device
52 measuring device
53 restrictor
54 restrictor
55 outlet opening
56 valve
57 valve
58 pilot valve
59 control device
60 blow mold
61 hollow glass article
62 base
63 line
64 line
65 valve
66 pilot valve
67 measuring device
68 restrictor
69 control device
70 outlet opening
71 blow head
72 blow head holder
73 line
74 proportional valve
75 measuring device
76 outlet opening
77 measuring sensor
78 valve
79 annular space
79' outlet opening
80 line
81 measuring device 82 valve
83 control device
84 pipe section
85 line
86 bore
87 line
88 measuring device
89 restrictor
90 control device
91 outlet opening
92 line
93 intermediate section
94 vacuum chamber
95 line
96 measuring device
97 restrictor
98 control device
99 dead plate
100 substructure
101 chamber
102 chamber
103 chamber
104 inlet chamber
105 line
106 chamber
107 measuring device
108 restrictor
109 control device

The invention claimed is:

1. A method for controlling air flow to one or more sections of an I.S. glassware forming machine which are used for forming a glass article, which air flow is used for glass blowing and/or cooling and which method includes providing one or more air passages for providing the air to said one or more sections, said method comprising:
   (a) providing air to cool one of said sections, said cooling air being provided to said one section through at least one of said air passages, said cooling method comprising:
      (a1) measuring volume flow rate of the cooling air passing through the section to be cooled;
      (a2) measuring temperature of said cooling air at an air inlet side of the at least one section;
      (a3) measuring temperature of said cooling air at an air outlet side of said at least one section;
      (a4) determining heat loss based on the measurements in steps (a1), (a2) and (a3); and
      (a5) varying the volume of air flowing to said at least one section through said air passage based on the heat loss determined in step (a4).

2. A method in accordance with claim 1 further comprising:
   (b) providing air for glass blowing to one of said sections through one of said air passages for shaping glass in a first phase of the method, said one section including a mold, said first phase comprising:
      (b1) measuring volume flow rate of the air used for shaping said glass;
      (b2) measuring pressure of the air used for shaping said glass;
      (b3) varying at least one of the volume flow rate and pressure of the air used for shaping said glass by use of the measurements determined in steps (b1) and (b2) to control the progress of the shaping phase;
      (b4) determining an end of the shaping phase by use of the measurements determined in steps (b1) and (b2); and
   (c) wherein the cooling air of step (a) is provided in a second phase of the method which follows the end of the shaping phase determined is step (b4).

3. A method of claim 2 wherein step (b3) is carried out by use of a mathematical model which includes desired values related to the shaping glass process.

4. A method of claim 3 wherein step (a5) is carried out by use of a mathematical model which includes desired values related to heat loss.

5. A method of claim 1 wherein step (a5) is carried out by use of a mathematical model which includes desired values related to heat loss.

6. A method in accordance with claim 1 wherein the steps (a1) through (a5) are carried out for both the parrison mold section and the blow mold section, each of which have their own air passages for delivering compressed air.

7. A method in accordance with claim 1 wherein said section of the I.S. glassware forming machine includes a parrison mold section.

* * * * *